US010748035B2

(12) United States Patent
Lee

(10) Patent No.: US 10,748,035 B2
(45) Date of Patent: Aug. 18, 2020

(54) VISUALLY AIDED ACTIVE LEARNING FOR TRAINING OBJECT DETECTOR

(71) Applicant: Mitsubishi Electric Research Laboratories, Inc., Cambridge, MA (US)

(72) Inventor: Teng-Yok Lee, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 223 days.

(21) Appl. No.: 16/027,781

(22) Filed: Jul. 5, 2018

(65) Prior Publication Data

US 2020/0012894 A1    Jan. 9, 2020

(51) Int. Cl.
*G06K 9/00* (2006.01)
*G06K 9/62* (2006.01)

(52) U.S. Cl.
CPC ....... *G06K 9/6262* (2013.01); *G06K 9/00624* (2013.01); *G06K 9/6267* (2013.01)

(58) Field of Classification Search
None
See application file for complete search history.

(56) References Cited

U.S. PATENT DOCUMENTS

| 7,263,227 | B2 | 8/2007 | Simard | |
|---|---|---|---|---|
| 9,740,956 | B2 | 8/2017 | Chen et al. | |
| 2012/0269436 | A1* | 10/2012 | Mensink | G06K 9/00624 382/180 |
| 2017/0124409 | A1 | 5/2017 | Choi et al. | |
| 2017/0206431 | A1* | 7/2017 | Sun | G06N 3/084 |
| 2017/0277710 | A1* | 9/2017 | Saaroni | G06F 11/3672 |
| 2018/0012106 | A1* | 1/2018 | Cox | G06K 9/00288 |
| 2018/0144241 | A1* | 5/2018 | Liu | G06K 9/6262 |

* cited by examiner

*Primary Examiner* — Hadi Akhavannik
(74) *Attorney, Agent, or Firm* — Gennadiy Vinokur; James McAleenan; Hironori Tsukamoto

(57) ABSTRACT

An active learning system classifies multiple objects in an input image from the set of images with a classification metric indicative of uncertainty of each of the classified object to belong to one or different classes and determines a diversity metric of the input image indicative of diversity of the objects classified in the input image. The active learning system evaluates the diversity metric of the input image and to cause rendering of the input image on a display device based on a result of the evaluation and trains the classifier using the labelled objects of the input image.

20 Claims, 18 Drawing Sheets

VISUALLY AIDED ACTIVE LEARNING FOR TRAINING OBJECT DETECTOR

TECHNICAL FIELD

This invention relates generally to object detectors, and more specifically to an active learning method for training the object detectors.

BACKGROUND

Artificial neural networks (NNs) are revolutionizing the field of computer vision. The top-ranking algorithms in various visual object recognition challenges, including ImageNet, Microsoft COCO, and Pascal VOC, are all based on NNs.

In the visual object recognition using the NNs, the large scale image datasets are used for training the NNs to obtain better performance. However, annotating large-scale image datasets is an expensive and tedious task, requiring people to spend a large amount of time analyzing image content in a dataset because the subset of important images in the unlabeled dataset are selected and labelled by the human annotations.

Active learning is a machine learning procedure that is useful in reducing the amount of annotated data required to achieve a target performance. It has been applied to various computer-vision problems including object classification and activity recognition. The active learning starts by training a baseline model (object detector, such as neural network) with a small, labelled dataset, and then applying the object detector to the unlabeled data. For unlabeled samples, the active learning estimates whether each unlabeled sample contains critical information that has not been learned by the baseline model. Once the unlabeled samples that bring the most critical information are identified and labelled by human annotators, the labelled samples can be added to the initial training dataset to retrain the model. Compared to passive learning, which randomly selects samples from the unlabeled dataset, the active learning can achieve the same accuracies with fewer but more informative labelled samples. See, e.g., U.S. Ser. No. 15/691,911.

Different active learning methods use different metrics for measuring how informative a sample is for the classification task. Examples of such metrics include the maximum uncertainty, expected model change, density weighted metric, etc. However, those metrics are still suboptimal for some applications. Accordingly, there is a need to develop optimal metrics of the active learning methods for other applications.

SUMMARY

Some embodiments provide a system and a method for image processing suitable for active learning of images that can be used for training a classifier, such as a neural network. Some embodiments are based on recognition that different active learning methods can use different metrics for measuring how informative a sample is for the classification task. Those metrics are used for improving informativeness of an image selected for labeling by a human operator. Examples of such metrics include the maximum uncertainty, expected model change, density weighted metric, etc. However, those metrics are still suboptimal for some applications.

Some embodiments are based on realization that one of the reasons for suboptimality of the metrics is due to the fact that those metrics concentrate on the performance of the classifier to classify an object in an image and the informativeness of the image is selected based on the results of the classification. However, in a number of active learning applications, the human operator is presented with the entire image while only a portion of that image is used to make an active learning decision.

Indeed, in a number of situations, an image can include multiple objects. If the decision to select the image for human labeling is determined based on individual and independent evaluation of each object in the image, such an approach can lead to a situation that when an image is presented for human labeling only one object out of multiple objects is required to be labelled, while for other objects the object detector is confident to determine their labels by itself. However, the time consumption of the active learning lies not only in human labeling an object but also in rendering multiple images to the human operator. To that end, when an image is selected for human labeling, it can be desired that the human operator is able to label multiple objects in the image that together, i.e., collectively, improve the informativeness of the training dataset. In other words, the selection of an image for active learning should be based not only on informativeness of the object in the image for the active learning, but also on informativeness of the image itself for the active learning.

To that end, some embodiments are based on recognition that the active learning systems tend to identify an object to be labelled for subsequent training. However, real-life images may have multiple objects useful for labeling and retraining. The computational expense of the active learning systems includes rendering the images to the user for labeling and removing the image from the memory after the user labelled the object. Some of this computational power can be saved if an image rendered to a user includes not only one but multiple objects. Further, it is recognized that for the active learning it is beneficial to present a user with the objects captured in a real-life image rather than a compound image including different objects retrieved from different images acquired at different times. This is because actual setting of the object can assist the labeling of small and/or partially occluded objects. To that end, some embodiments are based on realization, that the active learning system should assist a user to select an image from a video having multiple objects beneficial for the labeling and training a classifier.

However, when selecting an image with multiple objects is an objective, the metrics for selecting an object for active learning based only on a confidence or uncertainty of the classifier to classify the object is suboptimal. For example, if an image includes two different objects of the same type, similar appearance, and similar confidence of classification labeling both of those objects is as beneficial for training the classifier as labeling just one object. Accordingly, there is a need for a new type of metric for the active learning system selecting images that can include multiple objects for being labelled by the human.

Some embodiments are based on realization that such a metric should consider diversity of the classified objects in an image. To that end, some embodiments, additionally or alternatively to determining classification metric of the objects classified in the image, determine the diversity metric of the image itself. For example, some embodiments determine the diversity metric of the image based on a function of the classification metrics of the classified objects, a class diversity of the classified objects, and an appearance diversity of the classified objects.

For example, one embodiment considers only objects that are classified with a confidence below a threshold. In this embodiment, if an image includes multiple objects of the same classified type, the objects in the image are less diverse than in an image including classified objects of different types. To that end, the embodiment selects the classified objects in the input image with the classification metrics having the uncertainty below a classification threshold to estimate the diversity metric of the input image based on a class diversity of the selected objects. For example, in one implementation, the embodiment determines the class diversity based on a number of different classes of the selected objects.

Additionally, or alternatively, some embodiments determine the diversity metric of an image based on an appearance diversity including one or combination of differences in dimensions of bounding boxes surrounding the classified objects, differences in orientations of the bounding boxes surrounding the classified objects, the extent of overlapping of the bounding boxes.

Some embodiments are based on realization that when an input image is a part of a video, i.e., a set of images, the object tracking and classification of the tracked objects can improve overall accuracy of object detection and classification. For example, a confidence of classifying an object blocked by another object as a car can be increased if this object is tracked to another image in which this object is not blocked and can be classified as a car. Some embodiments are based on another realization that in case of mutually aided object detection and classification, the information about the entire set of image displayed on a display device can be beneficial for the active learning.

To that end, some embodiments the object detector and the image processor determine the classification metrics and the image statistics for all images in the set of images, and the active learning interface displays a histogram of multiple columns, in which each column correspond to an image from the set of images is colour coded according to the classification metrics and the image statistics of the corresponding image. For example, the width of each column can be just one pixel allowing to shows a relatively long set of images together, and the colour code of the column allows for visual selection of informativeness of the images.

For example, in one implementation, each column is partitioned into sections, the height of a section in the column corresponds to a particular value of the classification metric, and each section is coloured according to a function of the image statistics for the bounding shapes in the corresponding image having values of the classification metric corresponding to the particular value of the classification metric of the section. In such a manner, the histogram can compactly indicate the informativeness taking advantage of the structural column-based nature of the histogram.

Accordingly, one embodiment discloses an active learning system that includes an input interface to receive a set of images; a memory to store a set of executable components including a classifier to classify multiple objects in an input image from the set of images with a classification metric indicative of uncertainty of each of the classified object to belong to one or different classes; a diversity analyser to determine a diversity metric of the input image indicative of diversity of the objects classified in the input image; an active learning selector to evaluate the diversity metric of the input image and to cause rendering of the input image on a display device based on a result of the evaluation; and a trainer to receive labels of the classified objects of the input image from the display device and to train the classifier using the labelled objects of the input image; and a processor to execute the components stored in the memory.

Another embodiment discloses an active learning method, wherein the method uses a processor coupled with stored instructions implementing the method, wherein the instructions, when executed by the processor carry out steps of the method including receiving a set of images; classifying multiple objects in an input image from the set of images with a classification metric indicative of uncertainty of each of the classified object to belong to one or different classes; determining a diversity metric of the input image indicative of diversity of the objects classified in the input image; evaluating the diversity metric of the input image; causing rendering of the input image on a display device based on a result of the evaluation; receiving labels of the classified objects of the input image from the display device; and training the classifier using the labelled objects of the input image.

Yet another embodiment discloses a non-transitory computer readable storage medium embodied thereon a program executable by a processor for performing a method, the method includes receiving a set of images; classifying multiple objects in an input image from the set of images with a classification metric indicative of uncertainty of each of the classified object to belong to one or different classes; determining a diversity metric of the input image indicative of diversity of the objects classified in the input image; evaluating the diversity metric of the input image; causing rendering of the input image on a display device based on a result of the evaluation; receiving labels of the classified objects of the input image from the display device; and training the classifier using the labelled objects of the input image.

DETAILED DESCRIPTION

With a large amount of annotated data, convolutional neural networks (CNNs) can be trained to achieve a super-human performance for various visual recognition tasks. As tremendous efforts are dedicated into the discovery of effective network architectures and training methods for further advancing the performance, we argue it is also important to investigate into effective approaches for data annotation as data annotation is essential but expensive.

Data annotation is especially expensive for the object-detection task. Compared to annotating image class, which can be done via a multiple-choice question, annotating object location requires a human annotator to specify a bounding box for an object. Simply dragging a tight bounding box to enclose an object can cost 10-times more time than answering a multiple-choice question. Consequently, a higher pay rate has to be paid to a human labeller for annotating images for an object detection task. In addition to the cost, it is more difficult to monitor and control the annotation quality.

Active learning is a machine learning procedure that is useful in reducing the amount of annotated data required to achieve a target performance. It has been applied to various computer-vision problems including object classification, image segmentation, and activity recognition. Active learning starts by training a baseline model with a small, labelled dataset, and then applying the baseline model to the unlabelled data. For each unlabelled sample, it estimates whether this sample contains critical information that has not been learned by the baseline model. Once the samples that bring the most critical information are identified and labelled by human annotators, they can be added to the initial training dataset to train a new model, which is expected to perform better. Compared to passive learning, which randomly selects samples from the unlabelled dataset to be labelled, active learning can achieve the same accuracies with fewer but more informative labelled samples.

Multiple metrics for measuring how informative a sample is having been proposed for the classification task, including maximum uncertainty, expected model change, density weighted, and so on. The concept behind several of them is to evaluate how uncertain the current model is for an unlabelled sample. If the model could not assign a high probability to a class for a sample, then it implies the model is uncertain about the class of the sample. In other words, the class of the sample would be very informative to the model. This sample would require human to clarify.

Figure 1A:
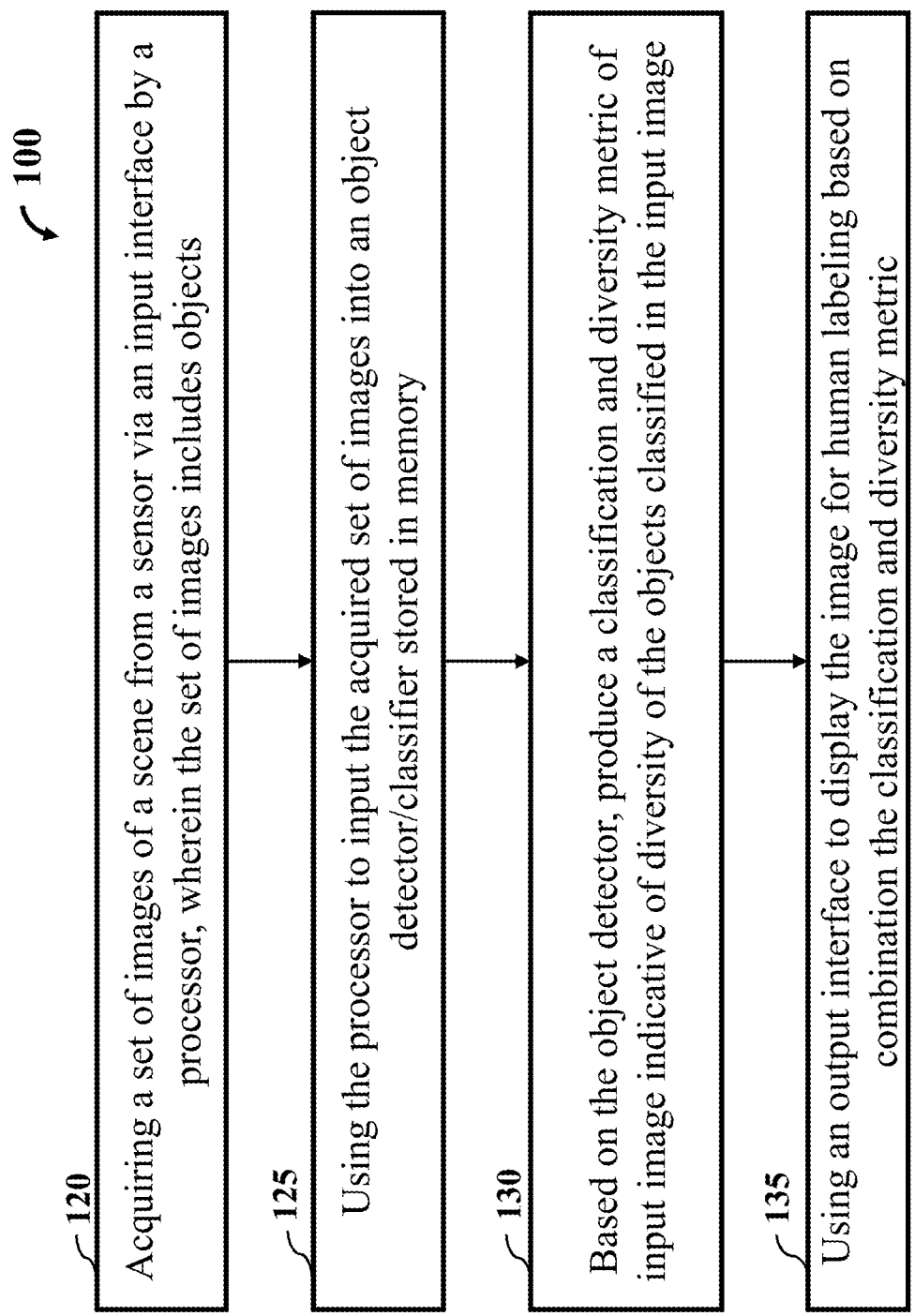
FIG. 1A is a block diagram illustrating an active learning system, according to one embodiment.

FIG. 1A is a block diagram illustrating an active learning system, according to one embodiment. Initially, the active learning system 100 includes the step of acquiring a set of images 120 of a scene from a sensor via an input interface by a processor, wherein the set of images includes objects. The next step includes using the processor to input the acquired set of images into an object detector and classifier 125 stored in memory. The classifier 125 is configured to classify multiple objects in an input image from the set of images with a classification metric indicative of uncertainty of each of the classified object to belong to one or different classes. For each image, a diversity analyser determines a diversity metric of the input image indicative of diversity of the objects classified in the input image, and an active learning selector 135 evaluates the diversity metric of the input image and to cause a rendering of the input image on a display device based on a result of the evaluation. For example, the step 135 includes using an output interface to display the image for human labeling when the diversity metric is above a threshold.

Figure 1B:
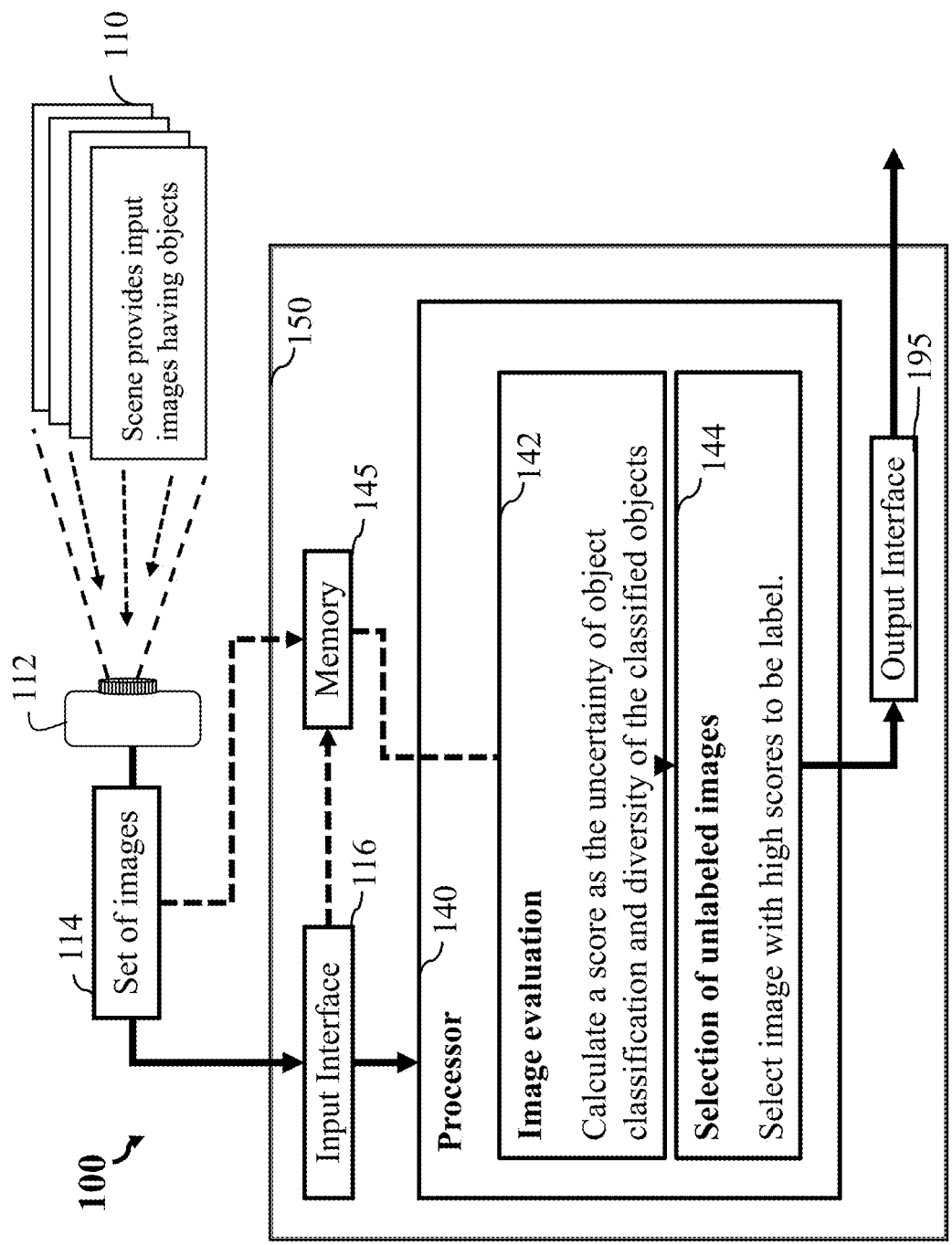
FIG. 1B is a block diagram illustrating the active learning system of FIG. 1A, that further includes some components used for the active learning system, according some embodiments.

FIG. 1B is a block diagram illustrating the active learning system of FIG. 1A, that further includes some components used for the active learning system, according some embodiments. The active learning system 100 includes a scene 110 that provides input images obtain by a sensor device 112. For example, the sensor(s) 112 may be a video camera or camera like device, that obtains data from the scene 110 so as to obtain the set of images 114. The data may also include environmental data such as environmental conditions such as temperature, and the like. The input images from the scene 110 include set of images 114 that are obtained by an input interface 116 that is processed by a processor 140. It is contemplated the set of images 114 can be stored in a memory 145 and then later processed by the processor 140. Further, the input interface 116 and the memory 145 may be in communication with a computer 150.

The processor 140 evaluates 142 the set of images 114 to produce a diversity metric of the input image indicative of diversity of the objects classified in the input image. The processor 140 evaluates the diversity metric of the input image and to cause 144 rendering of the input image on an output interface 195, e.g., a display device, based on a result of the evaluation Since the labelling budget is limited, given a pool of new unlabelled images, active learning aims to select a fixed number of images that are more challenging to the current object detection model than other images. After humans label these challenging images, the labelled images are added to the training set to fine-tune the current model.

Figure 2:
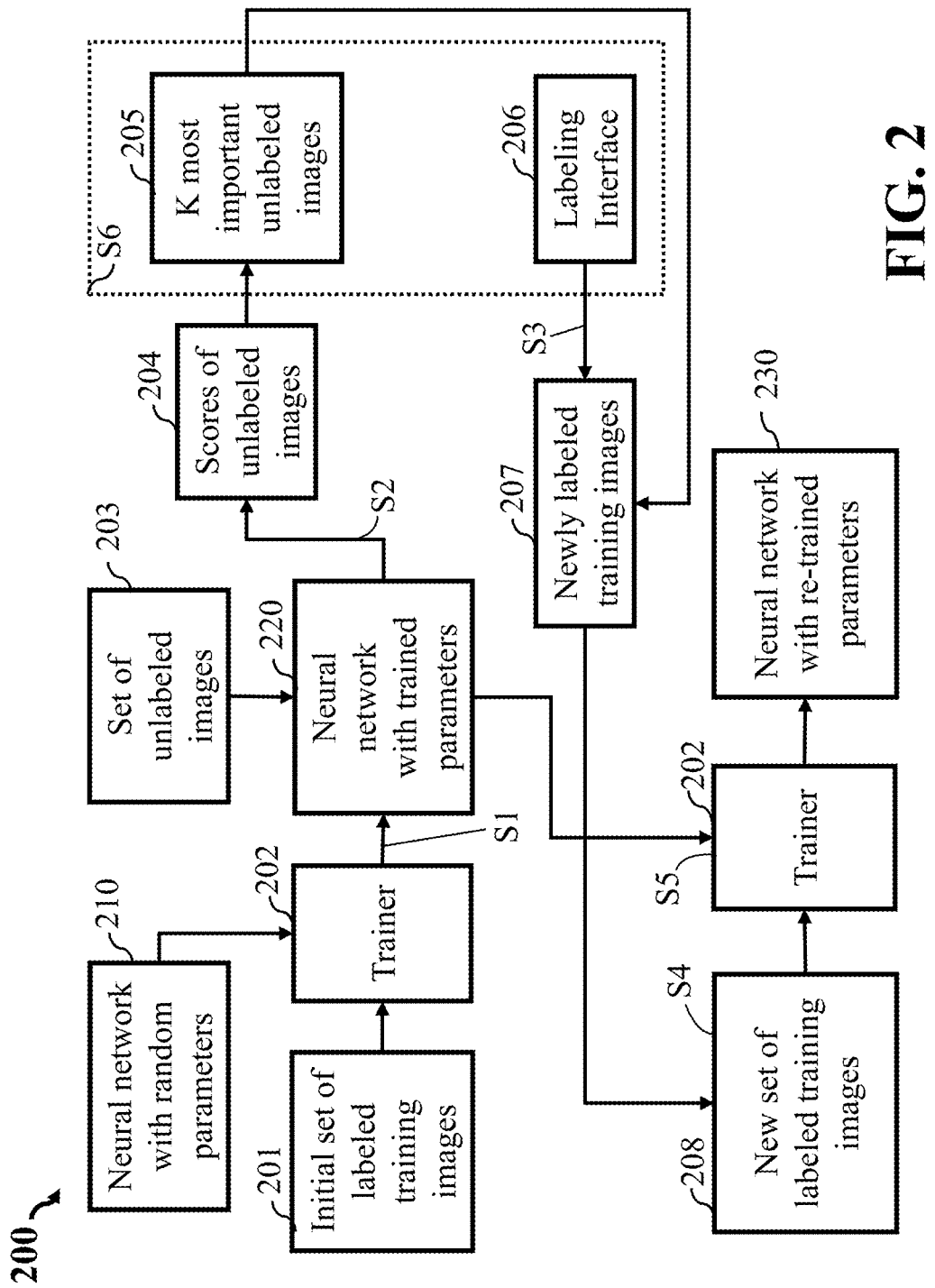
FIG. 2 is a block diagram of the data flow of an active learning system for training a neural network, according some embodiments.

FIG. 2 is a block diagram of the data flow of an active learning system for training a neural network, according some embodiments. For example, an initial setting of the active learning system 200 includes a neural network 210 initialized with random parameters, an initial set of labelled training images 201, a trainer 202, a set of unlabeled images 203. In this case, the neural network 210 is a user defined neural network.

The active learning system 200 attempts to efficiently query the unlabeled images for performing annotations through the basic workflow shown in FIG. 2. Based on the neural network (NN) 210 with randomly initialized parameters, the trainer 202 updates network parameters by fitting the NN 210 to the initial labelled training dataset of images 201. As a result, a trained NN 220 with the updated network parameters is used to rank the importance of images in an unlabeled dataset 203. The unlabeled images 203 are sorted according to importance scores 204 obtained from a ranking result performed by the trained NN 220. The K most important images 205 are stored into a labeling storage in a memory (not shown in FIG. 2) associated to a labeling interface 206. In response to data inputs made by an operator (or annotator), the labeling interface 206 generates annotated images 207 having the ground truth labels. These annotated images 207 are then added to the initial labelled training dataset 201 to form a new training dataset 208. The trainer 202 then retrains the network 220 by fitting the new training dataset of images 208 and obtains updated neural network parameters 230. This procedure is iterative. The updated neural network parameters 230 are used to rank the importance of the rest of the unlabeled images 203, and the K most important images 205 are sent to the labeling interface 206. Usually, this procedure is repeated several times until a predetermined preferred performance is achieved or the budget for annotations is empty.

Further, still referring to FIG. 2, the determining features may be performed by using an encoder neural network. In this case, the encoder neural network can perform feature analysis of given signals. In some cases, the signal may be an electroencephalogram (EEG) or an electrocardiogram (ECG). The neural network can use biological signals instead of image signals. Accordingly, some embodiments of the present disclosure can be applied to provide specific signals for assisting a diagnosis of medical doctors.

Figure 3:
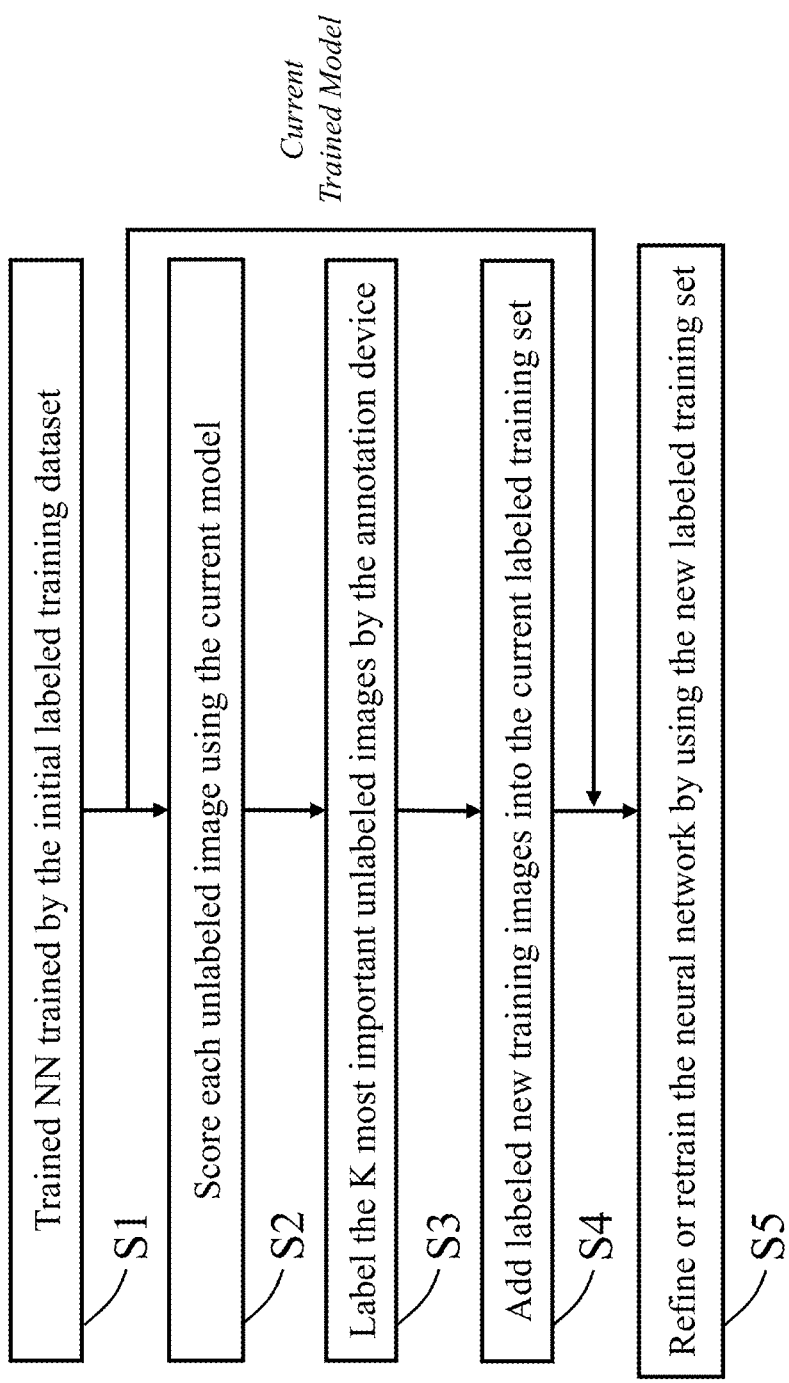
FIG. 3 is a flowchart of component of the active learning system for training a neural network, according some embodiments.

FIG. 3 is a flowchart of component of the active learning system for training a neural network, according to some embodiments. For example, the active learning system 200 attempts to efficiently query the unlabeled images for the annotation through a process flow including the following:

S1—An initial labelled training dataset is provided and the neural network is trained by using the dataset.

S2—By using the trained NN obtained in step S1, each image in the unlabeled dataset is evaluated and a score would be assigned to each image.

S3—Given the score obtained in step S2, images with the top K highest scores are selected for labeling by the annotation device.

S4—The selected images with newly annotated labels are added into the current (latest) labelled training set to get a new training dataset.

S5—The network is refined or retrained based on the new training dataset.

FIG. 3 shows the active learning part of the active learning system to efficiently query images for labeling images. An initialization model is trained on an initial for small labelled training set. Based on the current model, which is the latest trained model, the active learning system 200 tries to find the most informative unlabeled images to be annotated. A subset of the informative images are labelled and added to the training set for the next round of training. This training process is iteratively performed, and the active learning system 200 carefully adds more labelled images for gradually increasing the accuracy performance of the model on the test dataset. By the very nature, the algorithms of the active learning system 200 usually work much better than the standard approach for training, because the standard approach simply selects the samples at random for labeling.

Figure 4:
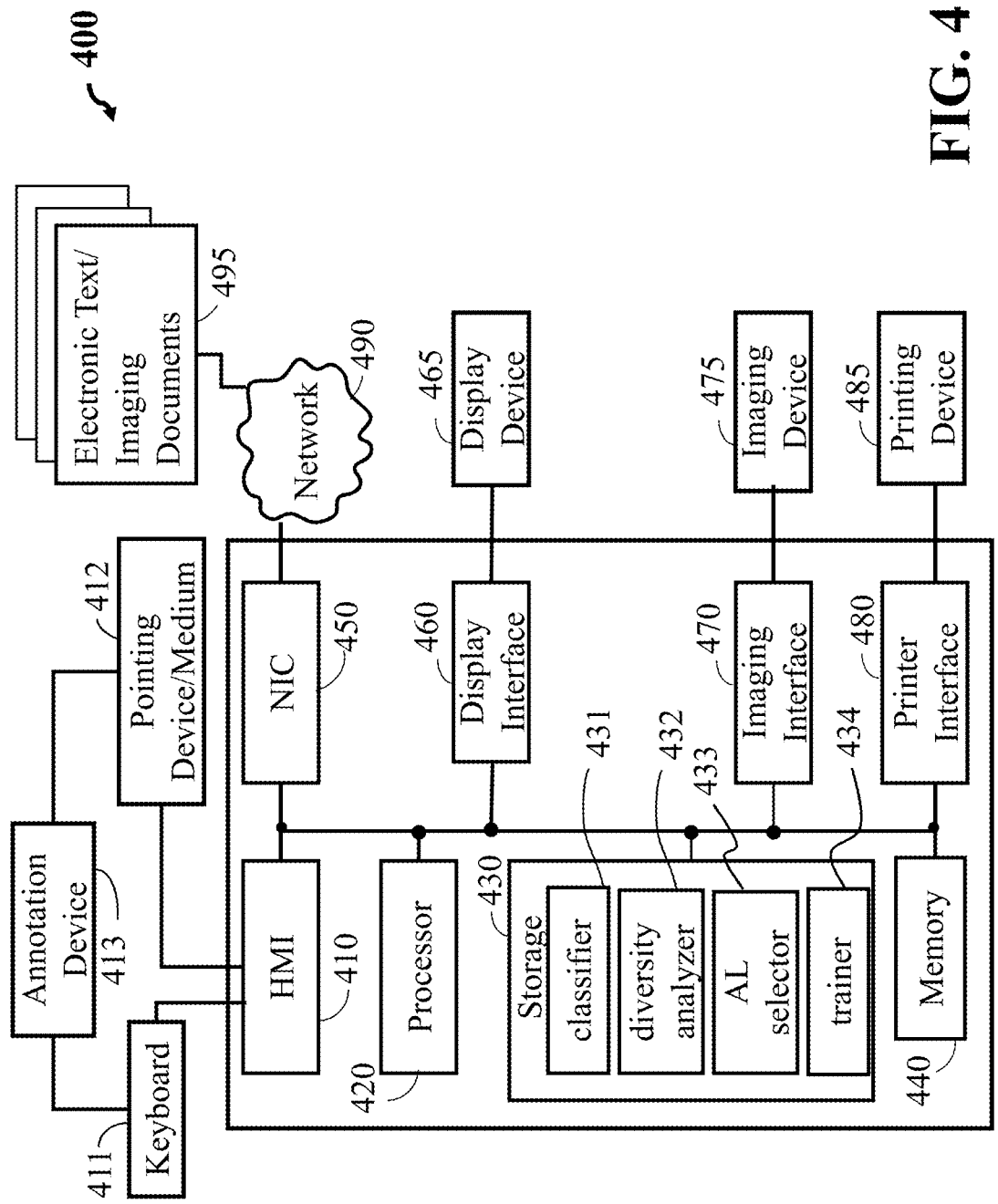
FIG. 4 shows a block diagram of an active learning system 400 according to some embodiments.

FIG. 4 shows a block diagram of an active learning system 400 according to some embodiments. The active learning system 400 can include a human machine interface (HMI) 410 connectable with a keyboard 411 and a pointing device/medium 412, a processor 420, a storage device 430, a memory 440, a network interface controller 450 (NIC) connectable with a network 490 including local area networks and internet network, a display interface 460, an imaging interface 470 connectable with an imaging device 475, a printer interface 480 connectable with a printing device 485. The processor 420 may include one or more than one central processing unit (CPU). The active learning system 400 can receive electric text/imaging documents 495 via the network 490 connected to the NIC 450. The active learning system 400 can receive annotation data from the annotation device 413 via the HMI 410. Further, the annotation device 413 can include a display screen, and the display screen of the annotation device 413 can be configured to display the labeling interface 206 of FIG. 2 that allows the operator to perform labeling process of unlabeled images stored in the memory 440 by showing the unlabeled image in the display region 401 with the selection area 402 having predetermined annotation boxes and predetermined labeling candidates to be selected.

The memory and/or a storage device 430 includes a set of executable components including a classifier 431 to classify multiple objects in an input image from the set of images with a classification metric indicative of uncertainty of each of the classified object to belong to one or different classes, a diversity analyzer 432 to determine a diversity metric of the input image indicative of diversity of the objects classified in the input image, an active learning selector 433 to evaluate the diversity metric of the input image and to cause rendering of the input image on a display device based on a result of the evaluation; and a trainer 434 to receive labels of the classified objects of the input image from the display device and to train the classifier using the labelled objects of the input image. The processor 420 is a hardware processor configured to execute the components stored in the memory.

Figure 5A:
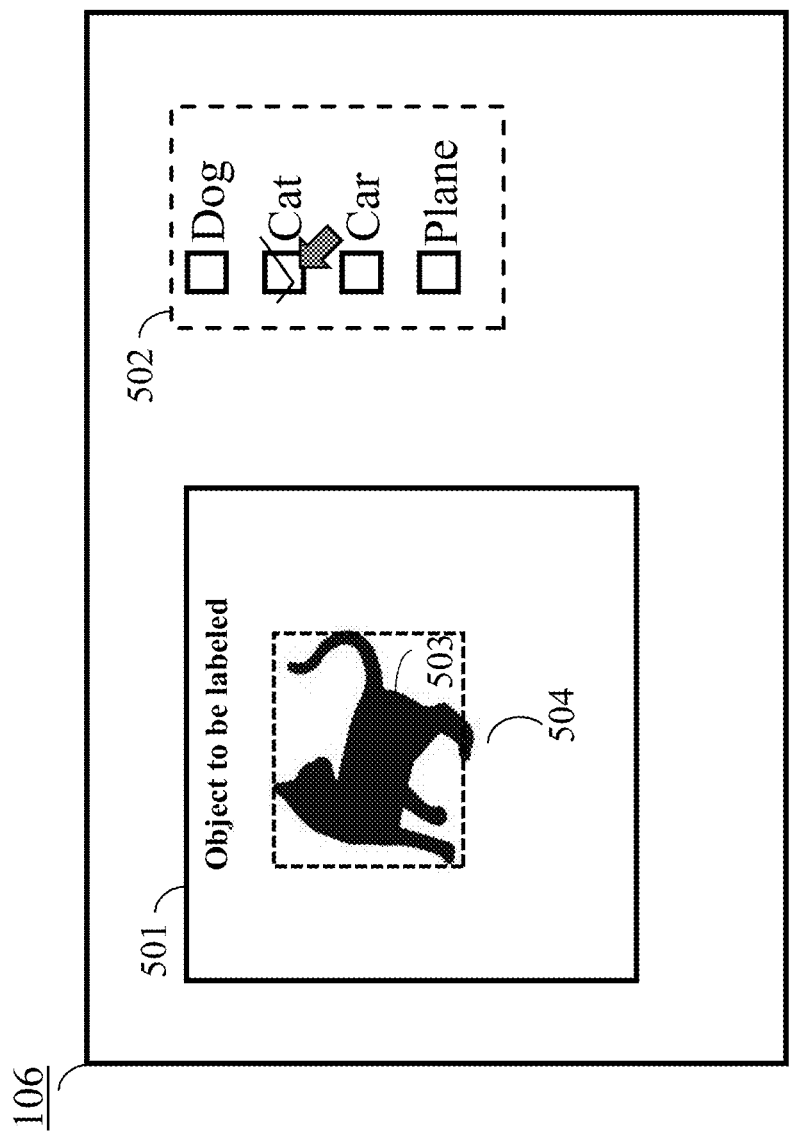
FIG. 5A shows an example of the labeling interface 106 of FIG. 2 according to some embodiments.

FIG. 5A shows an example of the labeling interface 106 of FIG. 2 according to some embodiments. In FIG. 5A, the labeling interface 206 of FIG. 2 includes a display region 501 and a selection area 502. The labeling interface 206 of FIG. 2 can be installed in the annotation device 413 of FIG. 4, which indicates the labeling interface 206 of FIG. 2 on a display of the annotation device 413 of FIG. 4. In some cases, the labeling interface 206 of FIG. 2 can be installed by an input/output interface (not shown in the FIG. 5A) connectable to the human machine interface (HMI) 410 of FIG. 4 via the network 490 of FIG. 4. When the labeling interface 206 of FIG. 2 receives an unlabeled image of the K most important unlabeled images 205 in step S6 of FIG. 2, the labeling interface 206 of FIG. 2 shows the unlabeled image on the display region 501 of FIG. 5A. The selection area 502 of FIG. 5 indicates predetermined candidates for labeling the unlabeled image shown on the display region 501. The labeling interface 206 of FIG. 2 allows an operator to assign one of selectable annotations indicated in the selection area 502 with respect to the unlabeled image shown in the display region 501. In FIG. 5A, the selection area 502 provides selection boxes with predetermined labeling candidates: Dog, Cat, Car, and Plane. As an example, FIG. 5A shows an unlabeled image indicating a cat image 503 displayed in the display region 501. In this case, the annotation box of Cat is checked by the operator (annotator) in response to the cat image shown in the selection area 502. Besides the categories, the labeler should also draw a bounding box that can tightly around the object. In this example, the box 504 is a tight bounding box to enclose the cat. The labeling interface 206 of FIG. 2 is configured to load and show unlabeled images stored the labeling storage in the memory according to the operations by the operator. The images labelled by the labeling interface 206 of FIG. 2 are stored into a new training image storage area in the memory in step S3 as newly labelled training images 207 as seen in FIG. 2.

Figure 5B:
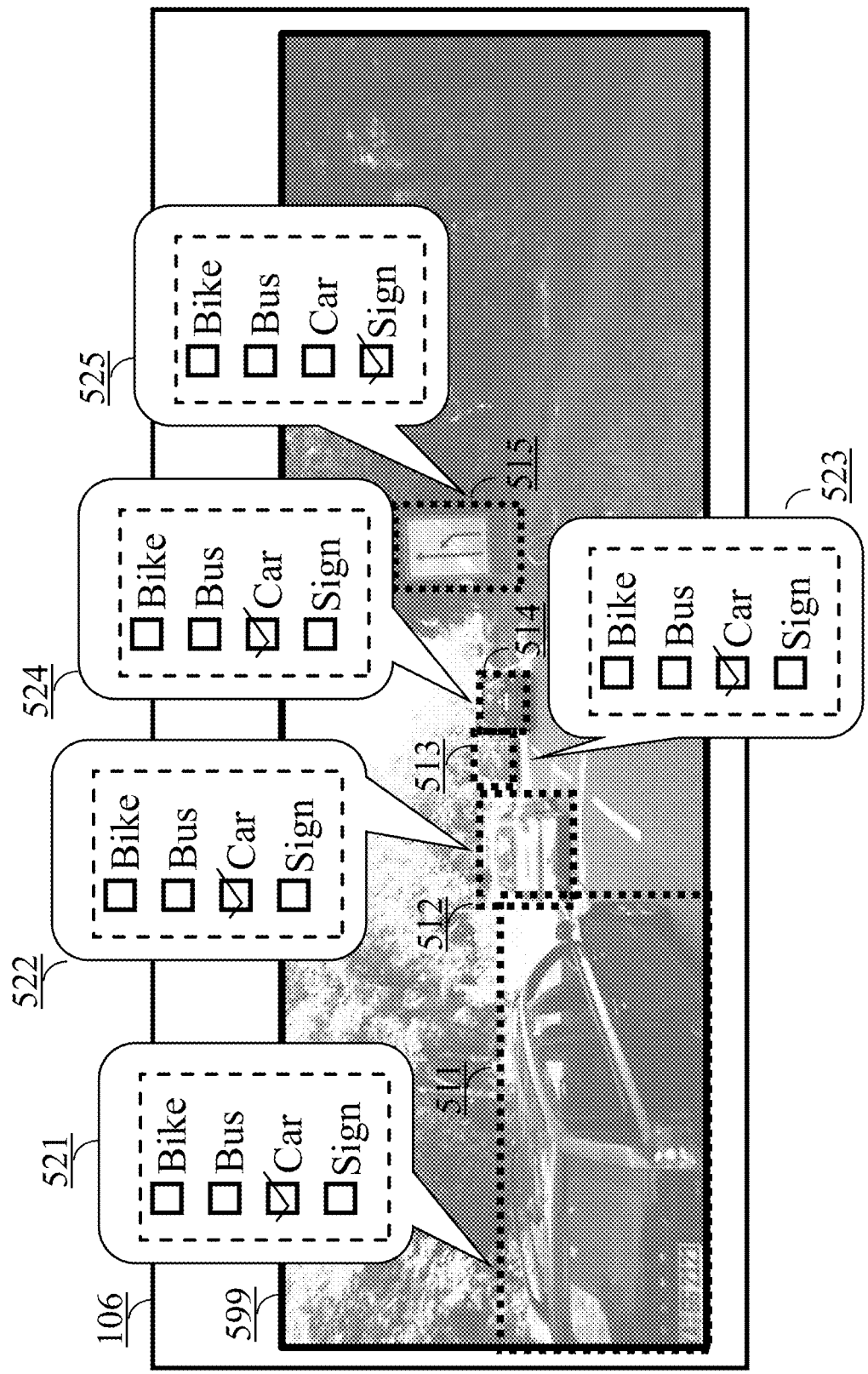
FIG. 5B shows another example of the labeling interface 106 of FIG. 2 according to some embodiments.

FIG. 5B shows another example of the labeling interface 106 of FIG. 2 according to some embodiments. These embodiments are based on recognition that real-life images may have multiple objects useful for labeling and retraining. The computational expense of the active learning systems includes rendering the images to the user for labeling and removing the image from the memory after the user labelled the object. Some of this computational power can be saved if an image rendered to a user includes not only one but multiple objects. Further, it is recognized that for the active learning it is beneficial to present a user with the objects captured in a real-life image rather than a compound image including different objects retrieved from different images acquired at different times. This is because actual setting of the object can assist the labeling of small and/or partially occluded objects.

To that end, some embodiments are based on realization, that the active learning system should assist a user to select an image from a video having multiple objects beneficial for the labeling and training a classifier. In the exemplar image 599 of FIG. 5B, five objects 511, 512, 513,514, and 515 are presented for labeling with five selection areas 521, 522, 523, 524, and 525, respectfully.

Figure 6:
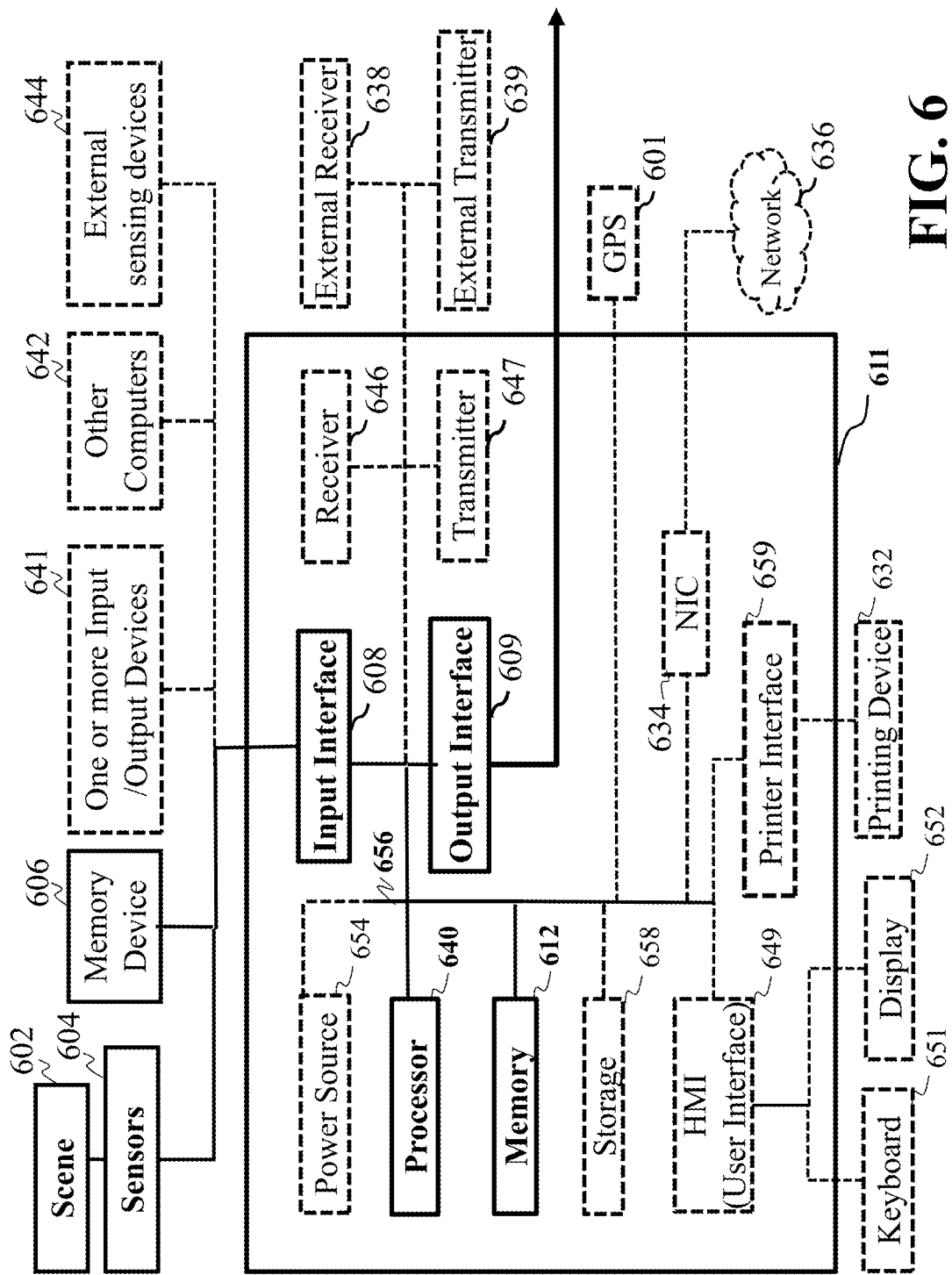
FIG. 6 is a block diagram of a system implementing the method of FIG. 1A using an alternate computer or processor, according to some embodiments.

FIG. 6 is a block diagram of a system implementing the method of FIG. 1A using an alternate computer or processor, according to some embodiments. The computer 611 includes a processor 640, computer readable memory 612, storage 658 and user interface 649 with display 652 and keyboard 651, which are connected through bus 656. For example, the user interface 649 in communication with the processor 640 and the computer readable memory 612, acquires and stores the measuring data in the computer readable memory 612 upon receiving an input from a surface, keyboard surface, of the user interface 657 by a user.

Contemplated is that the memory 612 can store instructions that are executable by the processor, historical data, and any data to that can be utilized by the methods and systems of the present disclosure. The processor 640 can be a single core processor, a multi-core processor, a computing cluster, or any number of other configurations. The processor 640 can be connected through a bus 656 to one or more input and output devices. The memory 612 can include random access memory (RAM), read only memory (ROM), flash memory, or any other suitable memory systems.

Still referring to FIG. 6, a storage device 658 can be adapted to store supplementary data and/or software modules used by the processor. For example, the storage device 658 can store historical device data and other related device data such as manuals for the devices, wherein the devices are sensing device capable of obtaining measured data as mentioned above regarding the present disclosure. Additionally, or alternatively, the storage device 658 can store historical data similar to the measuring data. The storage device 658 can include a hard drive, an optical drive, a thumb-drive, an array of drives, or any combinations thereof.

The system can be linked through the bus 656 optionally to a display interface (not shown) adapted to connect the system to a display device (not shown), wherein the display device can include a computer monitor, camera, television, projector, or mobile device, among others.

The computer 611 can include a power source 654, depending upon the application the power source 654 may be optionally located outside of the computer 611. A printer interface 659 can also be connected through bus 656 and adapted to connect to a printing device 632, wherein the printing device 632 can include a liquid inkjet printer, solid ink printer, large-scale commercial printer, thermal printer, UV printer, or dye-sublimation printer, among others. A network interface controller (NIC) 634 is adapted to connect through the bus 656 to a network 636, wherein measuring data or other data, among other things, can be displayed on a third party display device, third party imaging device, and/or third party printing device outside of the computer 611.

Still referring to FIG. 6, the measuring data or other data, among other things, can be transmitted over a communication channel of the network 636, and/or stored within the storage system 658 for storage and/or further processing. Further, the measuring data or other data may be received wirelessly or hard wired from a receiver 646 (or external receiver 638) or transmitted via a transmitter 647 (or external transmitter 639) wirelessly or hard wired, the receiver 646 and transmitter 647 are both connected through the bus 656. The computer 611 may be connected via an input interface 608 to external sensing devices 644 and external input/output devices 641. The computer 611 may be connected to other external computers 642 and external sensing devices 644. An output interface 609 may be used to output the processed data from the processor 640. Further, the sensors 604 can obtain the set of images from the scene 602.

Figure 7:
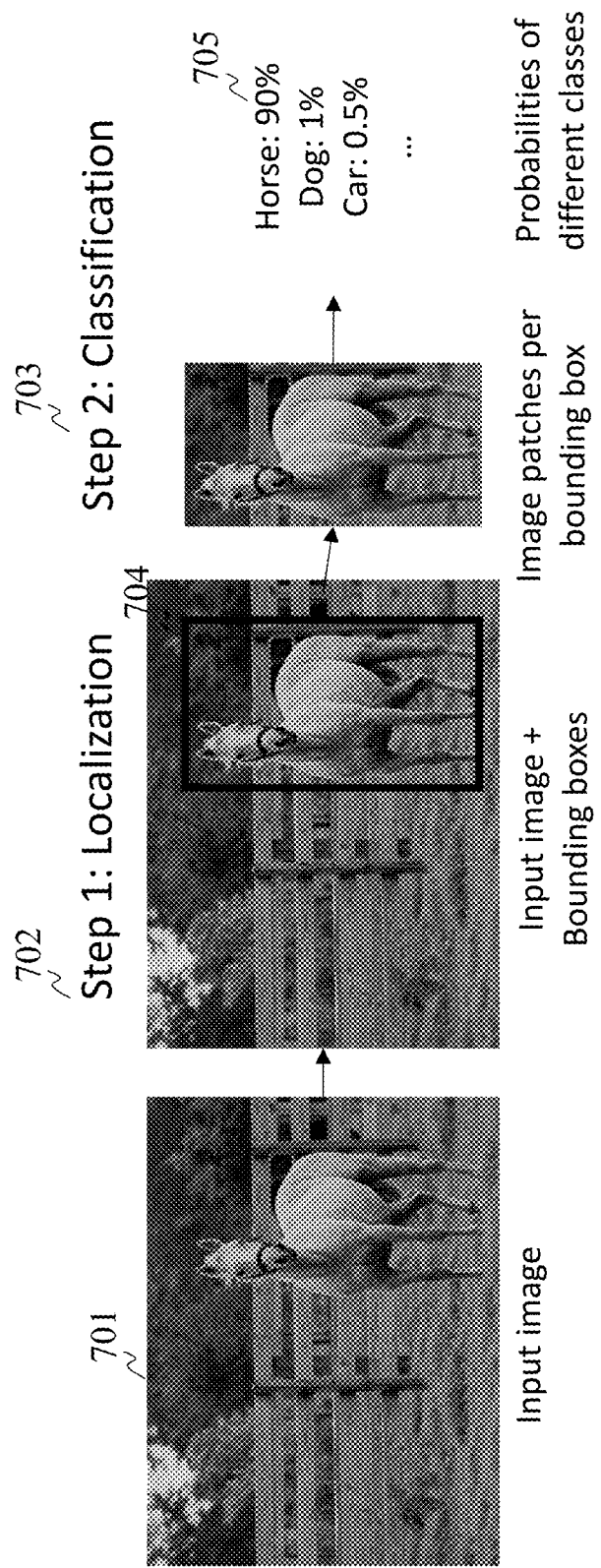
FIG. 7 is a schematic illustrating the process of object detection and/or classification according to one embodiment.

FIG. 7 is a schematic illustrating the process of object detection and/or classification according to one embodiment. Given an input image (701), an object detection performs two steps: Localization (702) and Classification (703). The localization step aims to accurately output bounding boxes of potential foreground objects in an image. For instance, as the image 701 contains a horse, the localization step should generate a tight bounding box (704) to enclose the horse. The bounding boxes should enclose the 2D coordinates of the 4 box corners.

Besides the 2D coordinates of the box corners, the $2^{nd}$ step Classification (703) aims to classify the image content within each bounding box into the corresponding object class. Classification step estimates the probability of difference classes, as shown in 705, and associates the index to the most possible object class with the bounding box. Besides the class index, Classification step also associates the corresponding class probability to the bounding boxes. Hereafter this class probability is called as the confidence score of this bounding box, which is a classification metric indicative of uncertainty of each of the classified object to belong to one or different classes.

In some implementations, when evaluating the accuracies of an object detection, the following factors are considered: 1) no background area is incorrectly detected by bounding boxes, 2) whether each foreground object is corrected classified, and 3) whether each foreground object is tightly enclosed by a bounding box. A bounding box should not be so loose that it contains too much background area, and should not be too small to enclose a complete object.

The classification step solves a classification problem: given an entire image, estimate the probabilities of different object classes. For example, the object detector/classifier can detect the semantic class of the at least one object in the image (classification) based on numerous machine learning algorithms such as convolution neural networks, support vector machine, etc. A classification method is applied to the image including an object to calculate the probability of this object to be each of the pre-defined classes. Such that, the uncertainty of the object detector about the semantic class of the object in the image can be a function of these probabilities of all pre-defined classes. For example, the more classes having a high probability, then there is a less certainty of estimating the classified class.

However, when selecting an image with multiple objects is an objective, the metrics for selecting an object for active learning based only on a confidence or uncertainty of the classifier to classify the object is suboptimal.

Figure 8A:
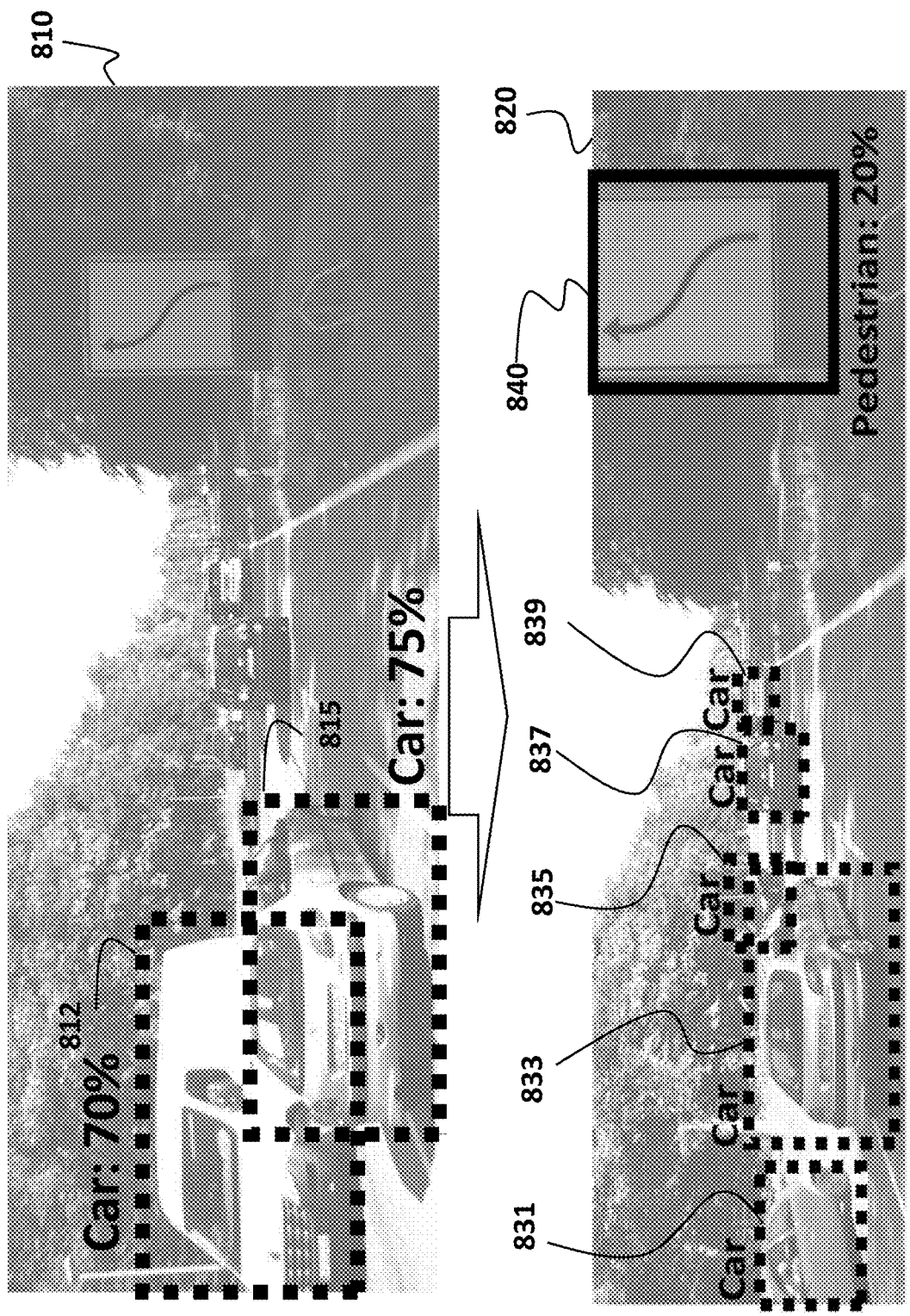
FIG. 8A shows a schematic illustrating active learning selection according to some embodiments.

FIG. 8A shows a schematic illustrating active learning selection according to some embodiments. For example, if an image 810 includes two different objects 812 and 815 of the same type, similar appearance, and similar confidence of classification labeling both of those objects is as beneficial for training the classifier as labeling just one object. Accordingly, there is a need for a new type of metric for the active learning system selecting images that can include multiple objects for being labelled by the human.

Some embodiments are based on realization that such a metric should consider diversity of the classified objects in an image. To that end, some embodiments, additionally or alternatively to determining classification metric of the objects classified in the image, determine the diversity metric of the image itself. For example, some embodiments determine the diversity metric of the image based on a function of the classification metrics of the classified objects, a class diversity of the classified objects, and an appearance diversity of the classified objects. For example, an image 820 includes six different objects 831, 833, 835, 837, 839, and 840 of different classes, i.e., classified diversity, and sizes, i.e., appearance diversity. Hence, the image 820 is better for active learning selection than the image 810.

Figure 8B:
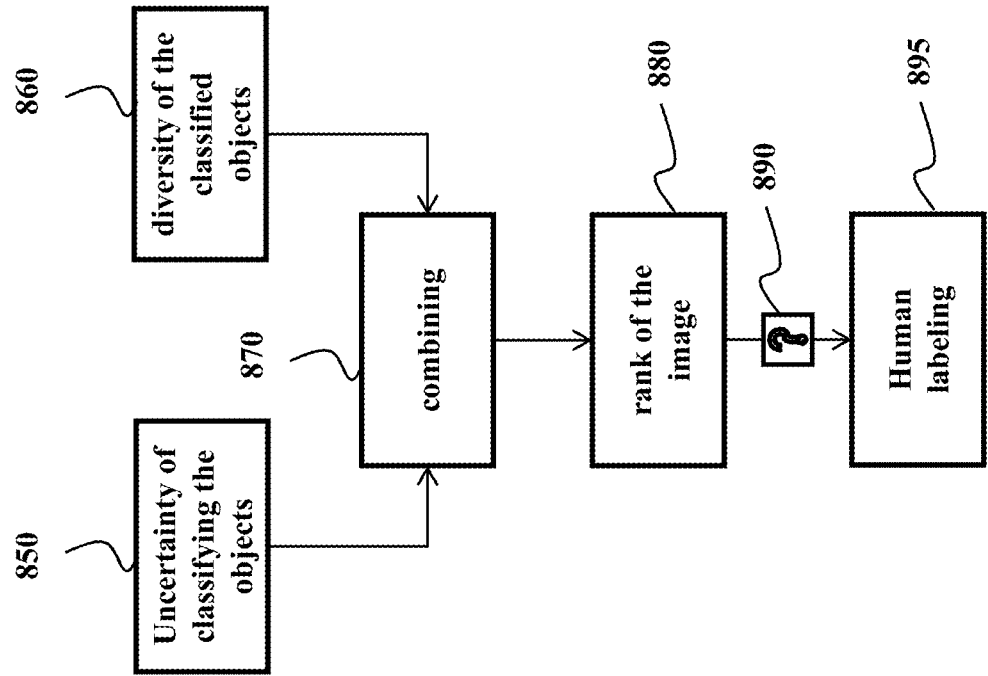
FIG. 8B shows a schematic of a method of active learning according to some embodiments.

FIG. 8B shows a schematic of a method of active learning according to some embodiments. A classifier to classify multiple objects in an input image from the set of images with a classification metric 850 indicative of uncertainty of each of the classified object to belong to one or different classes, while a diversity analyser determines a diversity metric 860 of the input image indicative of diversity of the objects classified in the input image. An active learning selector evaluates a combination 870 of the classification metric 850 and the diversity metric 860, and causes 890 rendering of the input image on a display device for human labelling 895 based on a result of the evaluation. For example, one embodiment ranks the input images according to the combination 870 of different metrics and send the image for labelling in an order of the ranking For example, one embodiment considers only objects that are classified with a confidence below a threshold. In this embodiment, if an image includes multiple objects of the same classified type, the objects in the image are less diverse than in an image including classified objects of different types. To that end, the embodiment selects the classified objects in the input image with the classification metrics having the uncertainty below a classification threshold to estimate the diversity metric of the input image based on a class diversity of the selected objects. For example, in one implementation, the embodiment determines the class diversity based on a number of different classes of the selected objects.

Additionally, or alternatively, some embodiments determine the diversity metric of an image based on an appearance diversity including one or combination of differences in dimensions of bounding boxes surrounding the classified objects, differences in orientations of the bounding boxes surrounding the classified objects, the extent of overlapping of the bounding boxes.

In such a manner, if active learning algorithms only consider the classification score of the detected bounding boxes, the selected images might be not the most challenging cases. In order to select a fixed number of images that can improve the object detection algorithm most, conceptually, some embodiments select more difficult images for the current object detector. To that end, other factors of the detected bounding boxes should be jointly considered.

Figure 9:
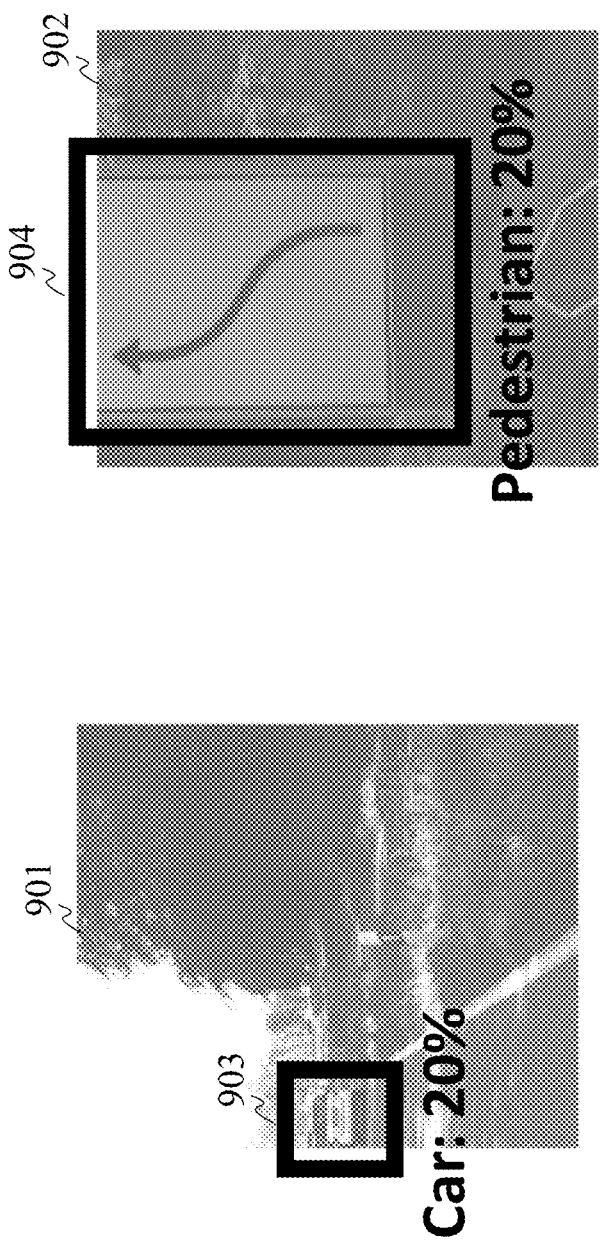
FIG. 9 shows a schematic of principles of evaluating diversity metric based on geometry of the bounding boxes around detected objects according to one embodiment.

FIG. 9 shows a schematic of principles of evaluating diversity metric based on geometry of the bounding boxes around detected objects according to one embodiment. Example of the considered geometry includes a size of a bounding box. FIG. 9 shows an example with two images 901 and 902, in each of which one bounding box (903 and 904, respectively) of the same score is detected. While the scores of both boxes are low (20%), the sizes of the bounding boxes are different. As larger bounding box has more pixels to classify, it is unusual that a large bounding box can have low score. As a result, given the two images, image 902 has higher diversity for being selected for human to examined and labelled.

Figure 10:
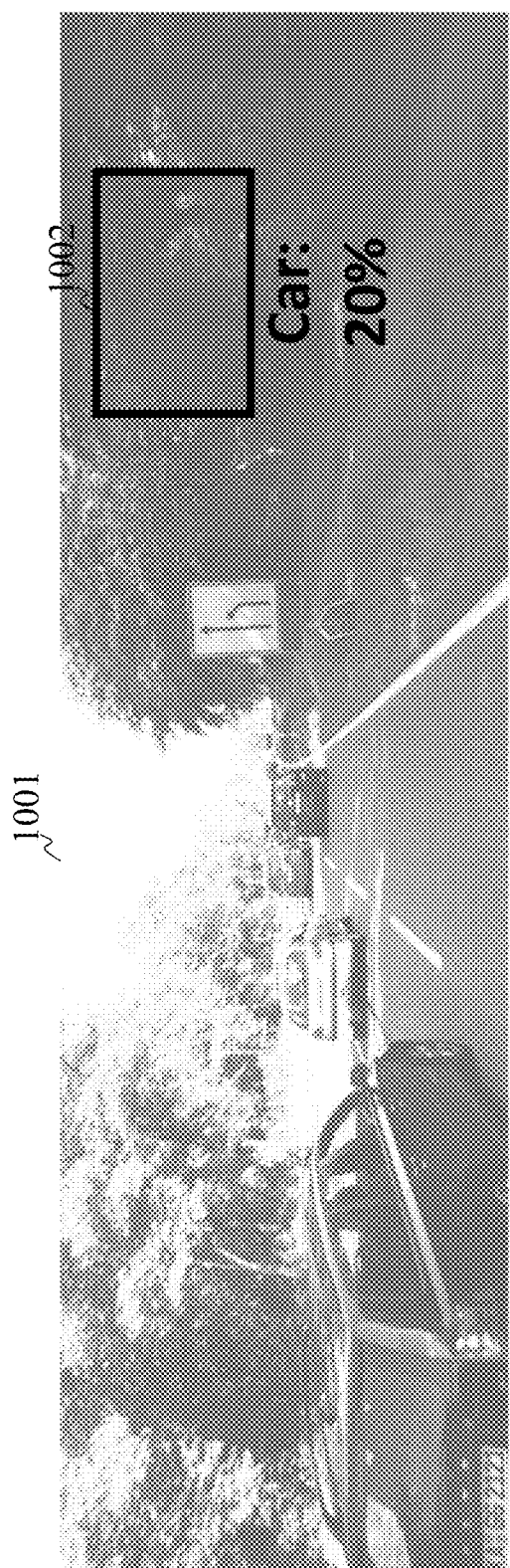
FIG. 10 shows a schematic of principles of evaluating diversity metric based on locations of the bounding boxes according to some embodiments.

FIG. 10 shows a schematic of principles of evaluating diversity metric based on locations of the bounding boxes according to some embodiments. FIG. 10 shows an example of the image 1001 captured by the mounted camera under the rear mirror inside a car. Such a camera setting is common for driving scenario. For driving scenario, it is unusual that car or pedestrians can show up in the top portion of the image. If a bounding box 1002 is detected in such a usual portion, this indicate that the location component of the object detector is wrong, and this image should be examined by humans.

Figure 11:
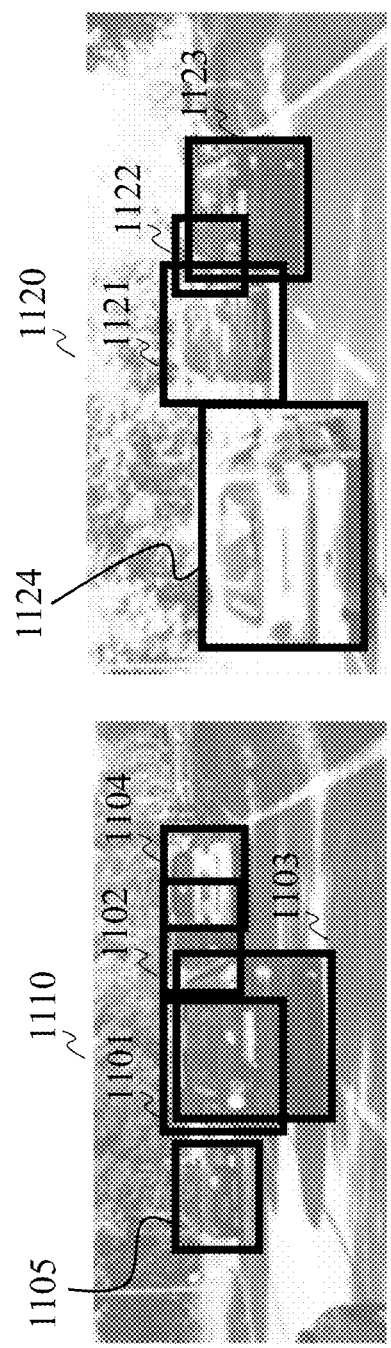
FIG. 11 shows a schematic of principles of evaluating the impact of bounding box geometry location according to one embodiment when multiple bounding boxes are detected together in a single image.

FIG. 11 shows a schematic of principles of evaluating the impact of bounding box geometry location according to one embodiment when multiple bounding boxes are detected together in a single image. In such a case, it is highly possible that the bounding boxes can overlap each other. For example, in image 1110, five bounding boxes 1101, 1101, 1103, 1004 and 1105, are detected, while four of these boxes, i.e., the bounding boxes 1101-1104 overlap. As a result, two of the bounding boxes (1101 and 1102) can only detect part of the occluded objects.

In contrast, in image 1120, four bounding boxes 1121, 1122, 1123, 1124 and are detected, where three bounding boxes 1121-1123 overlap. By comparing images 1110 and 1120, the image 1110 is more challenging and require more attention by humans to examine.

In such a manner, diversity of the bounding boxes, such as appearance diversity indicated by the geometry and/or location of the bounding boxes can also indicate the difficulty of an image to the current object detector. In some embodiments, the diversity and classification metrics are jointly considered.

Figure 12:
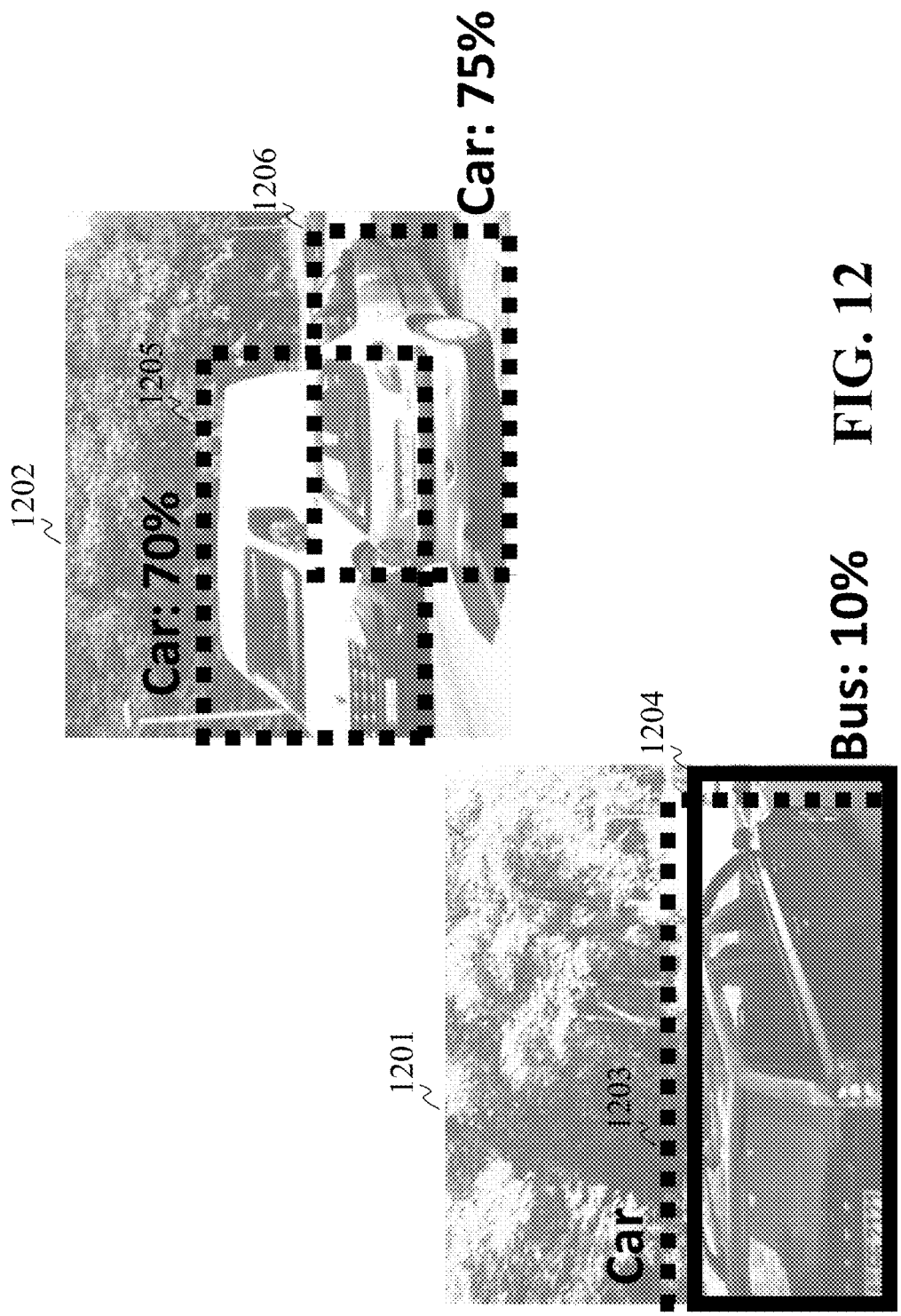
FIG. 12 shows a schematic of principles of evaluating diversity and classification metrics jointly according to some embodiments.

FIG. 12 shows a schematic of principles of evaluating diversity and classification metrics jointly according to some embodiments. FIG. 12 shows two images (1201 and 1202) with overlapped bounding boxes having different classification metric. In image 1201, two bounding boxes 1203 and 1204 actually detect the same object, which is a partially-visible car. Since only part of the car is visible, and this car has a box shape, the object detector is unsure whether it is indeed a car or a bus, which often has box shape. Consequently, even the detector detects two bounding box for this car, the score for the box is low. In contrast, image 1202 shows another image with two overlapped cars (1205 and 1206), but since both cars are still visible, the bounding boxes of both have high score. In such a case, image 1201 is more challenging and requires humans to examine.

As a result, compared to evaluating the classification score or size/location of individual bounding boxes, the active learning system of some embodiments consider the distribution of the detected bounding boxes that jointly considers multiple properties of the multiple bounding boxes in an image. These properties can include 1) the number of bounding boxes, 2) the sizes of the bounding boxes, 3) the classified classes of the bounding boxes, 4) the scores of the classified classes, i.e., the confidence of classification, and 5) the degree of overlapping among these bounding boxes. After the object detection is applied to an image, these properties indicate the difficulty of an image for the classification and consequently the usefulness of the image for human labelling.

For example, in some embodiments, the active learning selector determines the diversity metric of the input image based on a function of the classification metrics of the classified objects, a class diversity of the classified objects, and an appearance diversity of the classified objects. The class diversity is a function of a number of different classes of the classified objects in the input image. In addition, the appearance diversity is a function of one or combination of differences in dimensions of bounding boxes enclosing the selected objects, differences of orientations of the bounding boxes, and an extent of intersections of the bounding boxes.

For example, the active learning selector selects the classified objects in the input image with the classification metrics having the uncertainty below a classification threshold to estimate the diversity metric of the input image based on a class diversity of the selected objects. In one implementation, the active learning selector renders the input image on the display device when the diversity metric of the input image is greater than a diversity threshold, which can be a parameter selected by a user.

Additionally, or alternatively, in one embodiment, the active learning selector selects the classified objects in the input image with the classification metrics having the uncertainty below a classification threshold to estimate the diversity metric of the input image based on an appearance diversity of the selected objects.

These examples are mainly about the relationship of bounding boxes in a single image. However, given multiple images, some embodiments consider their similarity among these images. This is especially advantageous for images from a video sequence where nearby video frames can be similar. Consequently, these video frames might have similar images content and similar bounding boxes. In such a case, there is no need to select similar images since they are redundant. If any of them can improve the object detector, one frame should be sufficient.

In order to train a robust object detector with a limited set of annotated images, we design a new active learning approach that utilizes all of the properties above of all bounding boxes in a single image. Given an unlabelled image and bounding boxes detected by an object detector, our approach measures the joint distribution of these bounding boxes in terms of both classification scores and bounding box geometries. As such a distribution indicates the performance of the object detector on the corresponding image, we can use them to compare different images and select those that are most difficult to the current object detectors. By labelling these difficult images, the object detectors can be fine-tuned to learn these difficult cases.

Given an image with detected bounding boxes, some embodiments measure the distribution of bounding boxes by first computing a 2D map called Object Score Map. An object score map has the same size as the input image. Each element $(x, y)$ of the object score map has two values. One value is denoted as $C(x, y)$, which records the number of bounding boxes that overlap the pixel $(x, y)$ in the image. The other value is denoted as $S(x, y)$, which records the minimal value of classification metric of all bounding boxes that overlap with pixel $(x, y)$.

Given an image with detected bounding boxes, its object score map can be computed as follows. Initially, both C and S of all pixels are set to 0. For each bounding box b, which is bounded by points $(x_0, y_0)$ in the bottom left and $(x_1, y_1)$ in the top right, and associated with classification score $S_b$, we iterate through all each pixel $(x, y)$ from $(x_0, y_0)$ and $(x_1, y_1)$ to update $C(x, y)$ and $S(x, y)$. If $C(x, y)$ is 0, meaning no boxes have overlapped pixel $(x, y)$ yet, we assign $S_b$ to $S(x, y)$. Otherwise, $S_b$ is assigned to $S(x, y)$ only if $S_b$ is smaller than the current $S(x, y)$. Then we increment $C(x, y)$ by 1.

Namely, the scores S indicate the size of objects with low score object in this image, and the counters C indicate the degree of overlapping among the objects. We can further aggregate the scores S into a histogram called $H_1$, which counts the number of pixels of different ranges of confidence scores. This histogram is called as a coverage histogram. If an image contains multiple bounding boxes or one big bounding box with low scores, the coverage histogram $H_1$ will have high counts in the bins of low score ranges.

Figure 13:
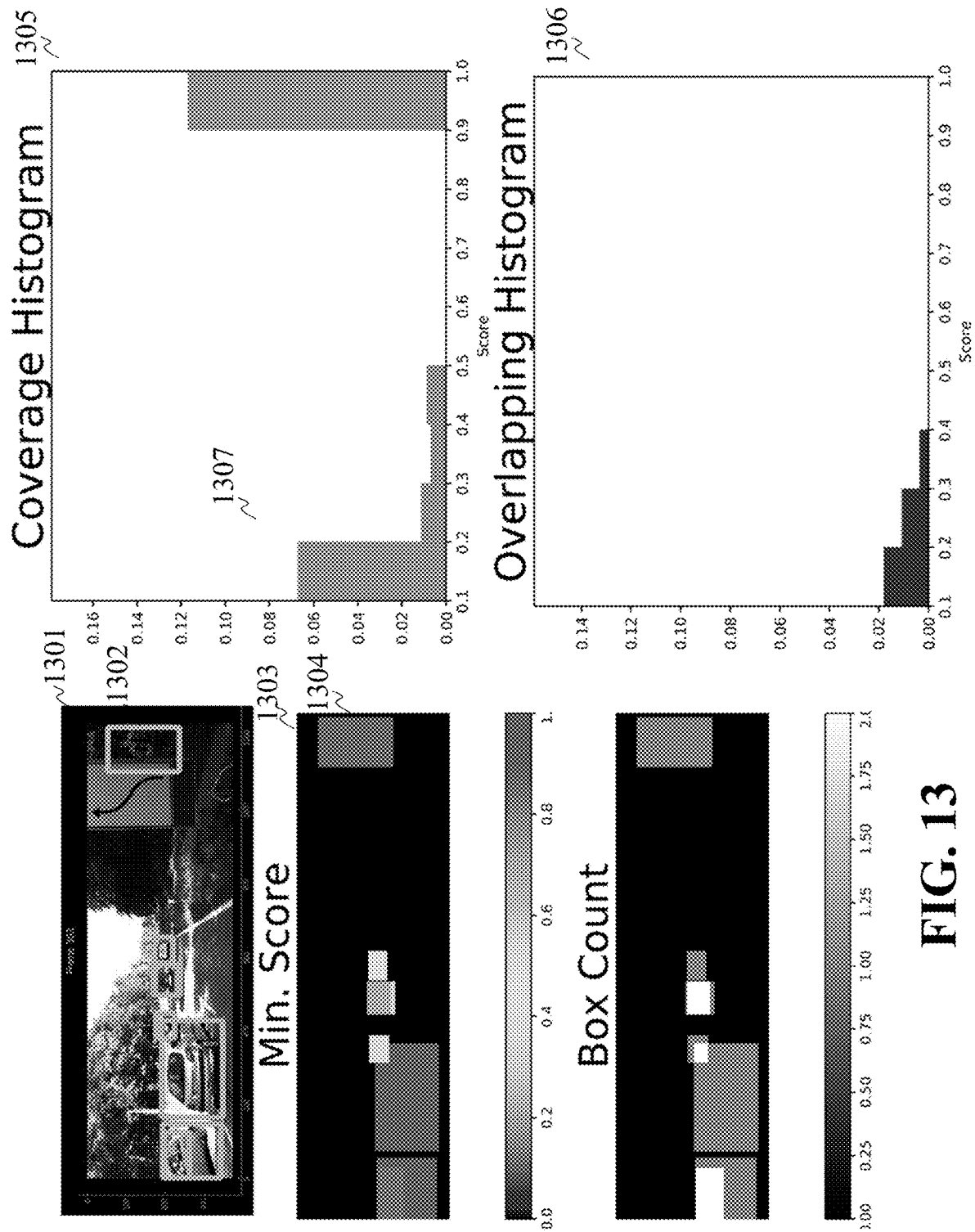
FIG. 13 shows an example of determining one or combination of a coverage histogram and an overlapping histogram to select the input image for labelling according to one embodiment.

FIG. 13 shows an example of determining one or combination of a coverage histogram and an overlapping histogram to select the input image for labelling according to one embodiment. In this example, an input image (1301) includes a bounding box (1302) that incorrectly encloses a background area. The confidence score of this bounding box is low, as shown in the corresponding region (1304) in the map C (1303). Consequently, its histogram $H_1$ (1305) can have high counts in the left bins (1307), which are for low confidence score.

It should be noted that the coverage histogram $H_1$ considers pixels covered by at least one bounding box. If we consider only pixels with counters C larger than 1, we can create another histogram H called Overlapping Histogram, to jointly considers the degree of overlapping of these bounding boxes.

Figure 14:
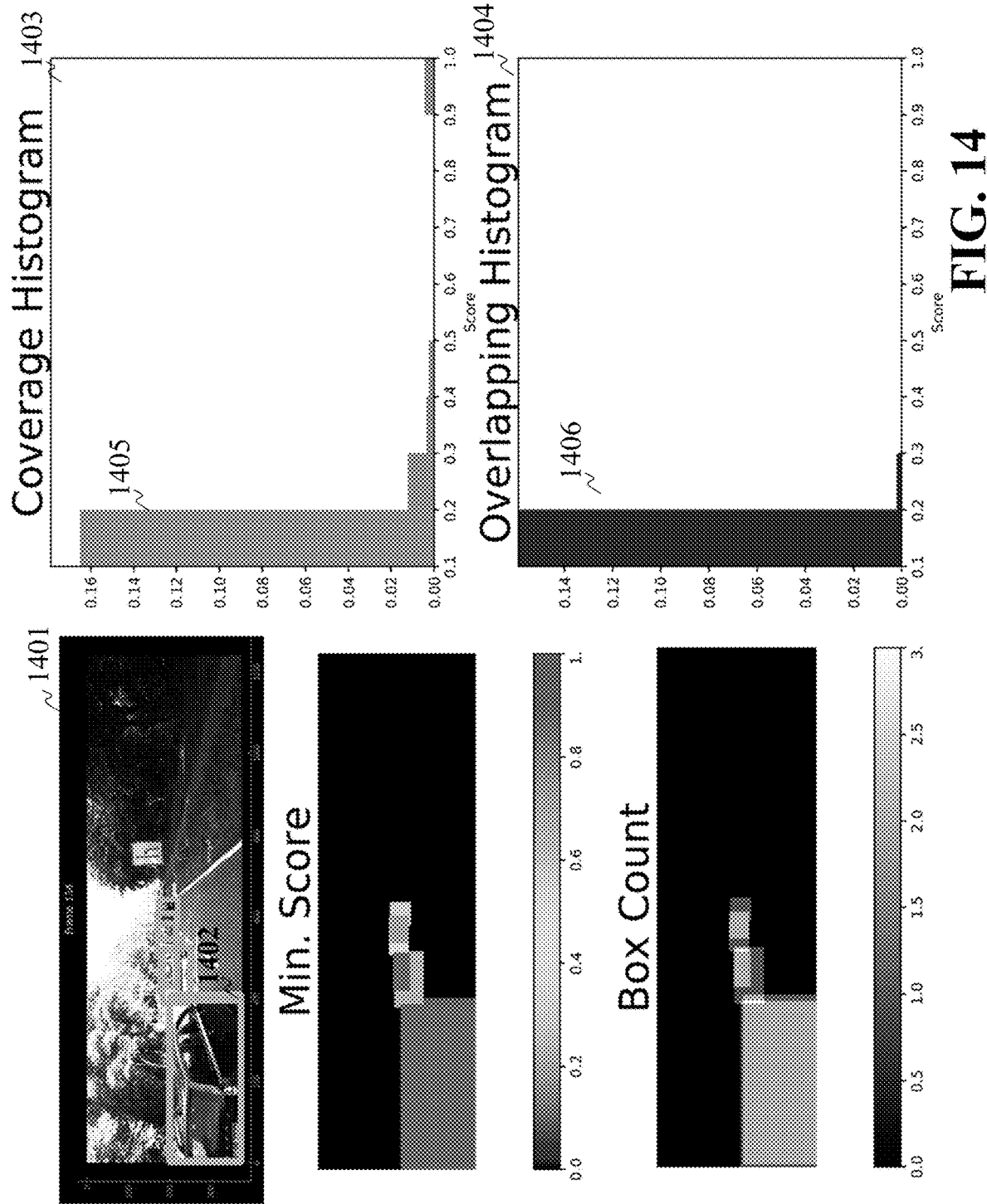
FIG. 14 shows another example of determining one or combination of a coverage histogram and an overlapping histogram to select the input image for labelling according to one embodiment.

FIG. 14 shows another example of determining one or combination of a coverage histogram and an overlapping histogram to select the input image for labelling according to one embodiment. In this example, an input image (1401) includes two highly overlapped bounding boxes in the bottom left (1402). One bounding box correctly classify the object as a car, which has high confidence score, but the other bounding box classify the object as a bus, which has low confidence score. As a result, both histograms $H_1$ (1403) and H (1404) show high counter values in the leftmost bin (1405 and 1406). In contrast, in the previous example of FIG. 13, the histogram H (1305) has much smaller counts than $H_1$ (1306) since the degree of overlapping is low.

Image Selection and Overview

With the object score maps, coverage histograms, and joint histograms, some embodiments can further aggregate them to numerical scores, which can be used to rank the corresponding images. The aggregation can be the number of pixels under a certain confidence score threshold, the weighted combination of the coverage histograms and overlapping histogram, etc. Once the images are ranked, we can select the most difficult ones to label and then fine-tune the current object detector.

The histograms can be also used to quickly detect similar image. If two images have very different coverage histograms and overlapping histograms, their image content should be very different as well. Otherwise, as the two image might be similar, we can compare the original 2D images to confirm, which is more accurate but slower than comparing the 1D histogram.

Figure 15:
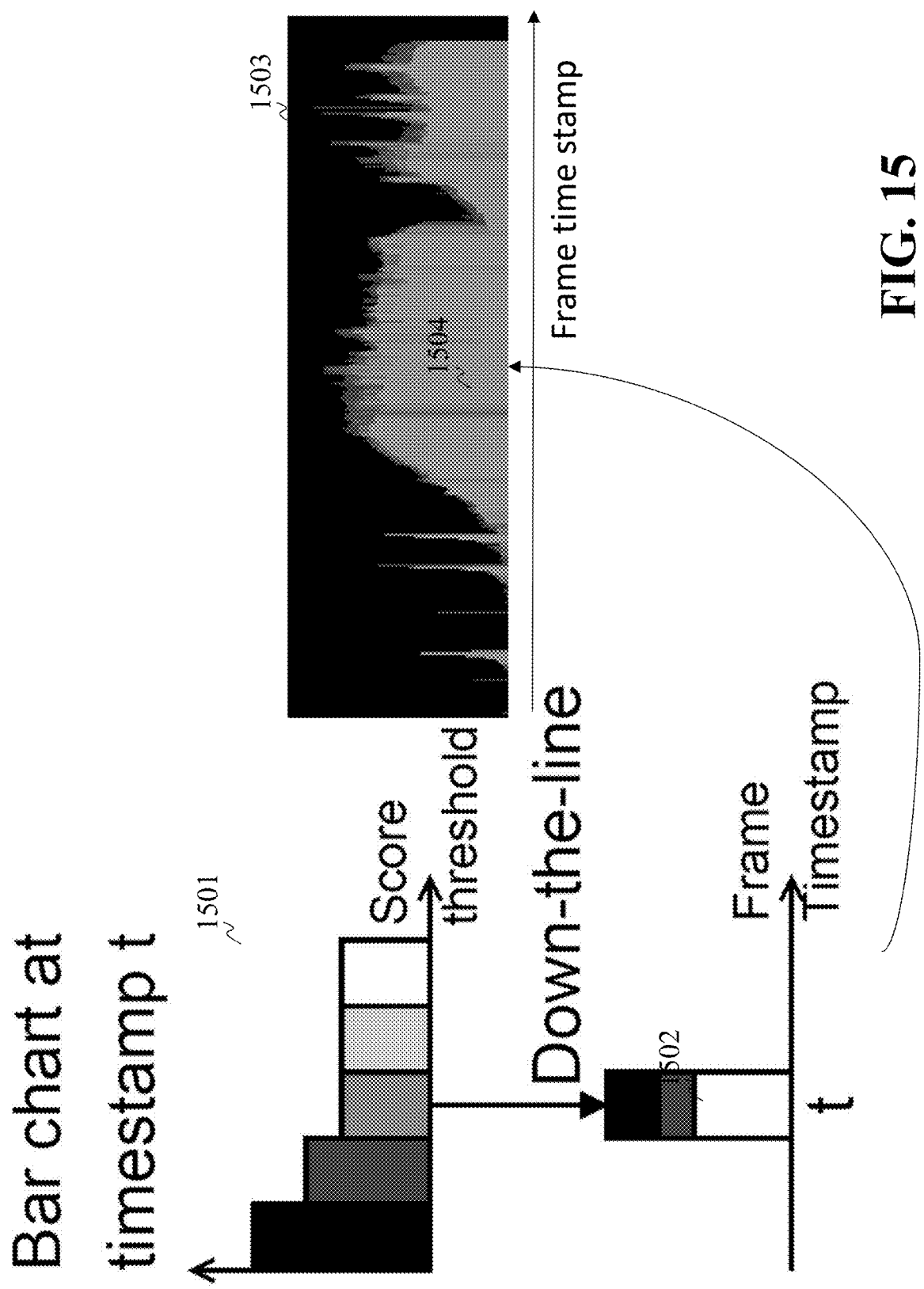
FIG. 15 shows a schematic of representing histograms for a sequence of images according to one embodiment.

FIG. 15 shows a schematic of representing histograms for a sequence of images according to one embodiment. Besides automatic selection and fast comparison of images, we can also use the coverage histograms and overlapping histogram of all images to effectively overview their difficulty to the current object detectors. The embodiment represents each histogram into a stacked bar chart, as shown in FIG. 15. While a histogram is plotted as a 2D bar chart (1501) where x-axis represents the time and y-axis represents the pixel counts, we can stack the bars from bottom to top in the order of corresponding score range (1502).

If the images to evaluate come from a video sequence, some embodiments can create such a stacked bar chart per video frame. By horizontally stacking the stacked bar charts in the same order of the frame in the video, we can create a 2D visualization, FIG. 15 shows the example (1503) of stacked coverage histogram of a video sequence. Here we colour the bars based on the corresponding score range: Bright for high score and dark for low scores. If a vertical bar chart shows a very dark portion, such as 1504, this frame has large area of low confidence scores.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention.

Therefore, it is the object of the appended claims to cover all such variations and modifications as come within the true spirit and scope of the invention.

I claim:

1. An active learning system, comprising:
an input interface to receive a set of images;
a memory to store a set of executable components including
a classifier to classify multiple objects in an input image from the set of images with a classification metric indicative of uncertainty of each of the classified object to belong to one or different classes;
a diversity analyser to determine a diversity metric of the input image indicative of diversity of the objects classified in the input image;
an active learning selector to evaluate the diversity metric of the input image and to cause rendering of the input image on a display device based on a result of the evaluation; and
a trainer to receive labels of the classified objects of the input image from the display device and to train the classifier using the labelled objects of the input image; and
a processor to execute the components stored in the memory.

2. The active learning system of claim 1, wherein the active learning selector determines the diversity metric of the input image based on a function of the classification metrics of the classified objects, a class diversity of the classified objects, and an appearance diversity of the classified objects, wherein the class diversity is a function of a number of different classes of the classified objects in the input image, and wherein the appearance diversity is a function of one or combination of differences in dimensions of bounding boxes enclosing the selected objects, differences of orientations of the bounding boxes, and an extent of intersections of the bounding boxes.

3. The active learning system of claim 1, wherein the active learning selector selects the classified objects in the input image with the classification metrics having the uncertainty below a classification threshold to estimate the diversity metric of the input image based on a class diversity of the selected objects.

4. The active learning system of claim 3, wherein the active learning selector renders the input image on the display device when the diversity metric of the input image is greater than a diversity threshold.

5. The active learning system of claim 1, wherein the active learning selector selects the classified objects in the input image with the classification metrics having the uncertainty below a classification threshold to estimate the diversity metric of the input image based on an appearance diversity of the selected objects.

6. The active learning system of claim 1, wherein the active learning selector determines a joint distribution of bounding boxes of the object classified in the input image based on the classification metric and the diversity metric by calculating an object score map defining an object score for each pixel at a location x and y in the input image, wherein the object score includes a value $C(x, y)$ defining a number of bounding boxes that overlap a pixel $(x, y)$ in the input image, and includes a value $S(x, y)$ defining a minimum value of the classification metric of all bounding boxes that overlap with pixel $(x, y)$.

7. The active learning system of claim 6, wherein the active learning selector evaluates the object score map to determine one or combination of a coverage histogram and an overlapping histogram to select the input image for labelling.

8. The active learning system of claim 1, wherein the classifier tracks the objects of the input image across multiple images in the set of images, classifies the tracked objects in the multiple images, and updates the classification metrics of the objects in the input image based on classification metrics of the objects tracked and classified in the multiple images.

9. The active learning system of claim 1, wherein the processor causes the classifier and the analyser to determine the classification metrics and the diversity metrics for all images in the set of images, and wherein the components stored in the memory include an active learning interface configured to display a histogram of multiple columns on the display device, each column correspond to an image from the set of images, and each column is colour coded according to the diversity metric of the corresponding image.

10. The active learning system of claim 9, wherein each column is partitioned into sections, wherein a height of a particular section in the column corresponds to a particular value of the classification metric, wherein each section is coloured according to a function of the diversity metric of the corresponding image determined for the classified object classified with the particular value of the classification metric of the section.

11. The active learning system of claim 10, wherein the width of the column is a pixel of a resolution of the display device.

12. The active learning system of claim 1, wherein the memory stores a training set of labelled objects, wherein the trainer updates the training set with the labelled objects of the input image and retrains the classifier using the updated training set.

13. The active learning system of claim 1, wherein the set of images includes one or combination of intensity images and depth images.

14. The active learning system of claim 1, wherein the classifier is a binary classifier.

15. The active learning system of claim 1, wherein the classifier is a multi-label classifier, wherein the objects in the input image are classified independently for each class.

16. The active learning system of claim 1, wherein the classifier is a convolutional neural network.

17. An active learning method, wherein the method uses a processor coupled with stored instructions implementing the method, wherein the instructions, when executed by the processor carry out steps of the method, comprising:
receiving a set of images;
classifying multiple objects in an input image from the set of images with a classification metric indicative of uncertainty of each of the classified object to belong to one or different classes;
determining a diversity metric of the input image indicative of diversity of the objects classified in the input image;
evaluating the diversity metric of the input image;
causing rendering of the input image on a display device based on a result of the evaluation;
receiving labels of the classified objects of the input image from the display device; and
training the classifier using the labelled objects of the input image.

18. The active learning method of claim 17, wherein the diversity metric of the input image is determined based on a function of the classification metrics of the classified objects, a class diversity of the classified objects, and an appearance diversity of the classified objects.

19. A non-transitory computer readable storage medium embodied thereon a program executable by a processor for performing a method, the method comprising:
receiving a set of images;
classifying multiple objects in an input image from the set of images with a classification metric indicative of uncertainty of each of the classified object to belong to one or different classes;
determining a diversity metric of the input image indicative of diversity of the objects classified in the input image;
evaluating the diversity metric of the input image;
causing rendering of the input image on a display device based on a result of the evaluation;
receiving labels of the classified objects of the input image from the display device; and
training the classifier using the labelled objects of the input image.

20. The medium of claim 19, wherein the diversity metric of the input image is determined based on a function of the classification metrics of the classified objects, a class diversity of the classified objects, and an appearance diversity of the classified objects.

* * * * *